A. M. MacFARLAND.

SHEET FOLDING MACHINE.

APPLICATION FILED AUG. 5, 1921.

Reissued Dec. 6, 1921.

15,242.

6 SHEETS—SHEET 1.

Inventor
Allison M. MacFarland
by Parker & Prochnow
Attorneys

A. M. MacFARLAND.

SHEET FOLDING MACHINE.

APPLICATION FILED AUG. 5, 1921.

Reissued Dec. 6, 1921.

15,242.

6 SHEETS—SHEET 2.

Inventor
Allison M. MacFarland.
by Parker & Rochrow.
Attorneys

A. M. MacFARLAND.

SHEET FOLDING MACHINE.

APPLICATION FILED AUG. 5, 1921.

Reissued Dec. 6, 1921.

15,242.

6 SHEETS—SHEET 3.

Inventor
Allison M. MacFarland.
By Parker & Prochnow.
Attorneys.

A. M. MacFARLAND.

SHEET FOLDING MACHINE.

APPLICATION FILED AUG. 5, 1921.

Reissued Dec. 6, 1921. 15,242.

6 SHEETS—SHEET 4.

Inventor
Allison M. MacFarland
by Parker & Prichard.
Attorneys

A. M. MacFARLAND.

SHEET FOLDING MACHINE.

APPLICATION FILED AUG. 5, 1921.

Reissued Dec. 6, 1921.

15,242.

6 SHEETS—SHEET 5.

Inventor
Allison M. MacFarland.
By Parker & Prochnow
Attorneys.

A. M. MacFARLAND.
SHEET FOLDING MACHINE.
APPLICATION FILED AUG. 5, 1921.
Reissued Dec. 6, 1921.
15,242.
6 SHEETS—SHEET 6.
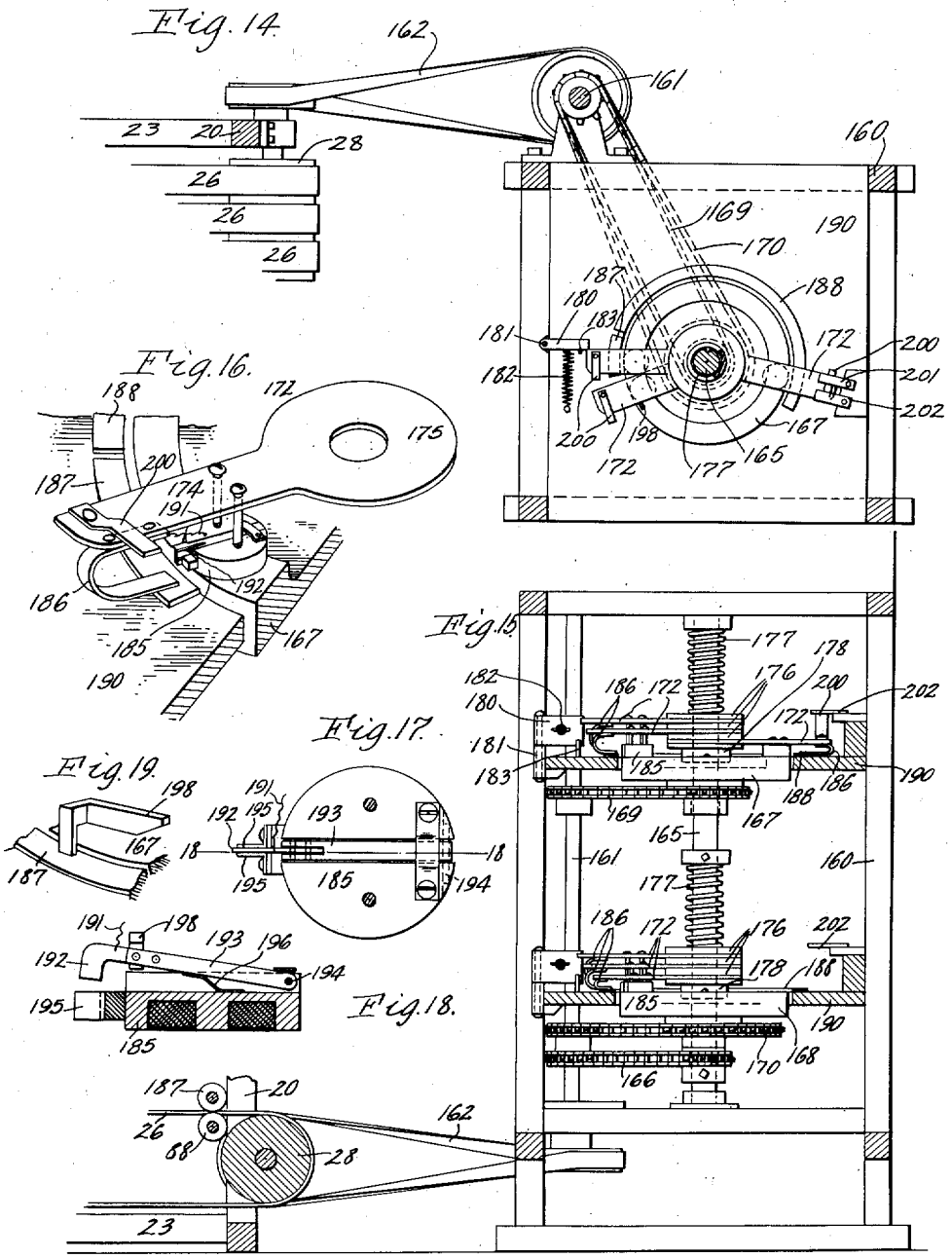
Inventor
Allison M. MacFarland
by Parker & Prochnow.
Attorneys

UNITED STATES PATENT OFFICE.

ALLISON M. MACFARLAND, OF WILKINSBURG, PENNSYLVANIA, ASSIGNOR TO LEO M. KOHN, OF BUFFALO, NEW YORK.

SHEET-FOLDING MACHINE.

15,242. Specification of Reissued Letters Patent. Reissued Dec. 6, 1921.

Original No. 1,313,713, dated August 19, 1919, Serial No. 90,739, filed April 12, 1916. Application for reissue filed August 5, 1921. Serial No. 490,149.

*To all whom it may concern:*

Be it known that I, ALLISON M. MACFARLAND, a citizen of the United States, residing at Wilkinsburg, in the county of Allegheny and State of Pennsylvania, have invented new and useful Improvements in Sheet-Folding Machines, of which the following is a specification.

This invention relates to machines for folding sheets of textile and other material.

The objects of the invention are to produce a folding mechanism which is capable of folding sheets of different lengths midway between their ends; also to provide a machine in which a plurality of these mechanisms are arranged to fold a sheet a number of times; also to provide a machine of this kind which is so constructed as to receive and fold sheets of material as they are ordinarily discharged from an ironing machine or other device; also to provide a folding mechanism which is adapted to operate on various grades or kinds of textile material without wrinkling the same; also to provide a timing mechanism which will cause a sheet of any length to be folded at any desired distance between the ends of the sheet; also to provide a machine of this kind which is divided into sections which may be operated together when the sheet to be folded is of the full width of the machine, or separately if a plurality of narrow sheets are fed simultaneously to the machine; also to improve machines of this kind in other respects hereinafter specified.

In the accompanying drawings:

Fig. 14 is a fragmentary sectional plan view of a folding machine having a timing mechanism of alternative construction.

Fig. 15 is a fragmentary sectional elevation thereof.

Fig. 16 is a fragmentary perspective view thereof, showing one of the feeder actuating devices of the alternative construction.

Fig. 17 is a detailed top plan view thereof showing the magnet and holding arm of the feeder actuating device.

Fig. 18 is a sectional elevation thereof on line 18—18, Fig. 17.

Fig. 19 is a fragmentary perspective view of a cam and stop for holding the feeder actuating devices.

Figures 1, 2:
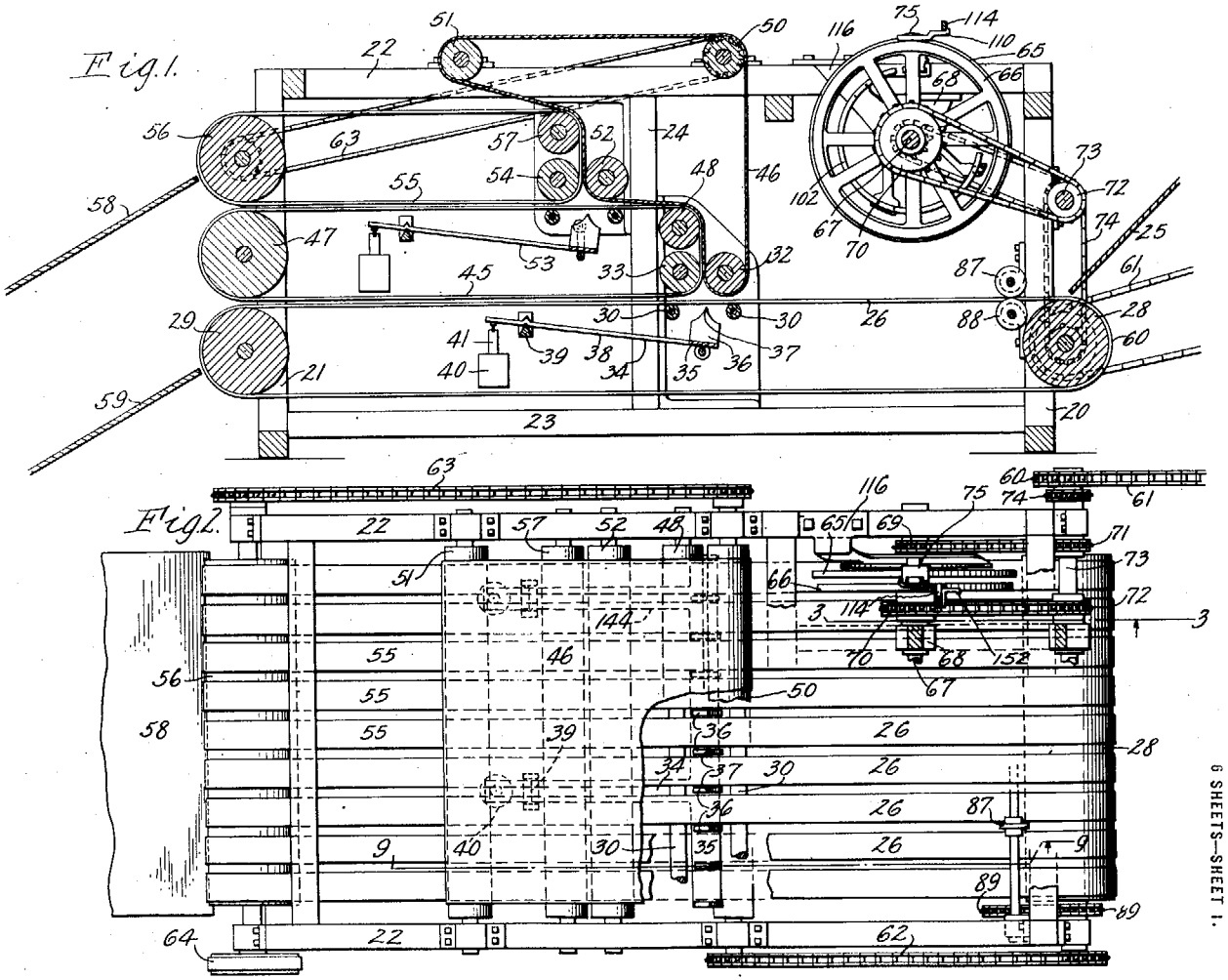
Figure 1 is a longitudinal sectional elevation of a sheet folding machine embodying the invention.
Fig. 2 is a top plan view thereof shown partly in section and having parts of the second folding mechanism omitted.
Figure 3:
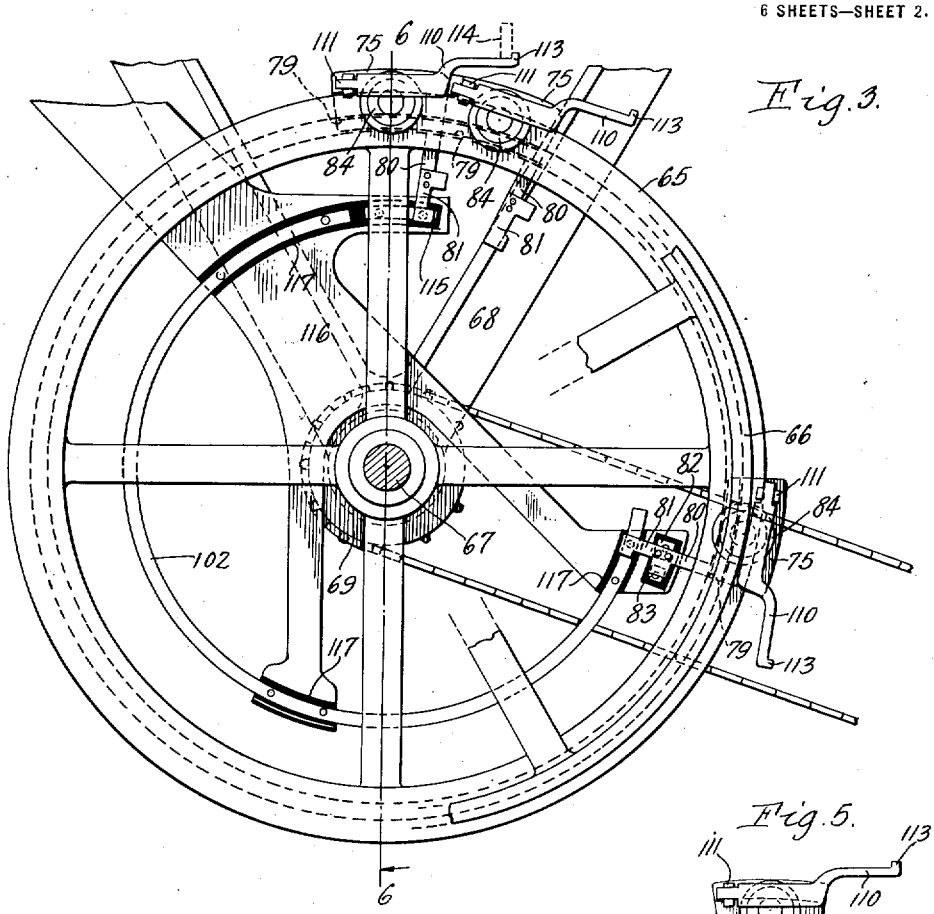
Fig. 3 is a fragmentary sectional elevation thereof on line 3—3, Fig. 2, on an enlarged scale, showing a timing or center finding mechanism.
Figure 5:
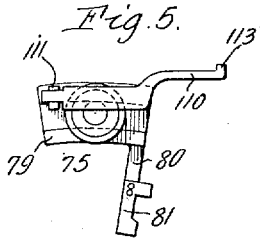
Fig. 5 is a detached elevation of one of the traveling feeder actuating devices of the timing mechanism.
Figure 4:
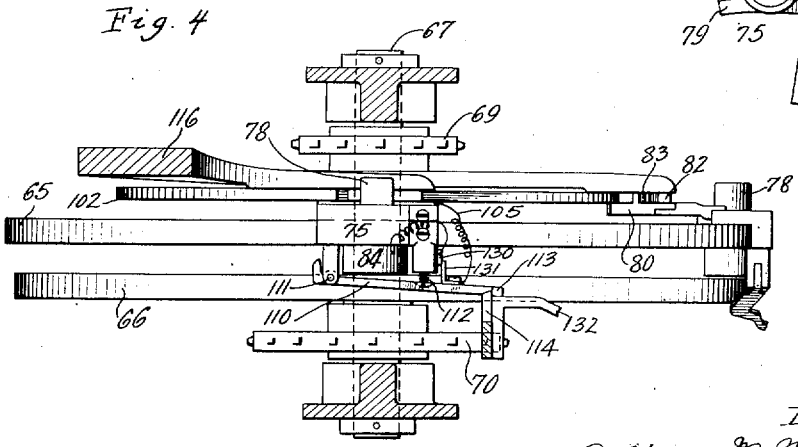
Fig. 4 is a top plan view of the timing or center finding mechanism.
Figure 6:
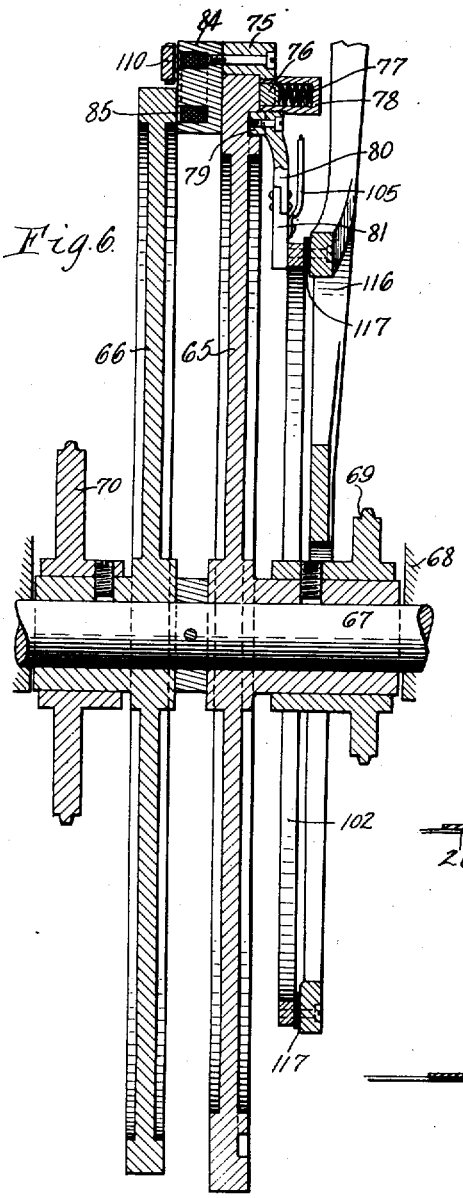
Fig. 6 is a central sectional elevation, on an enlarged scale, on line 6—6, Fig. 3.

The frame on which the parts of the folding machine are mounted may be of any suitable construction, that shown including upright legs or members 20 and 21, top and bottom members 22 and 23, and intermediate members 24 connecting the top and bottom members.

The folding machine is especially adapted for use in laundries for folding sheets, towels and other flat articles, and is preferably arranged in operative relation to an ironing machine or other device (not shown) in such a manner that the sheets to be folded are fed directly from the ironing machine to the folding machine without requiring any handling. In the construction shown in the drawings, the sheets pass to the folding machine over a plate 25 and upon the upper run of a carrier which may consist of a plurality of endless tapes, belts or the like 26 which, in the construction shown, are spaced apart and pass over rolls 28 and 29 suitably journaled on the frame of the machine. The upper runs of the tapes 26 may be supported intermediate of their ends by supporting rollers 30.

Figure 9:
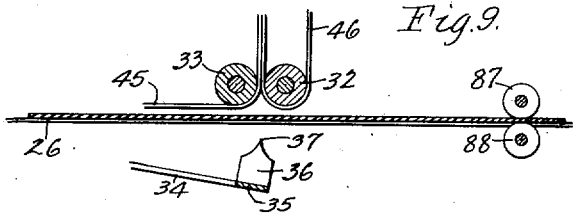
Figs. 9 and 10 are fragmentary sectional elevations on line 9—9, Fig. 2, showing one of the feeding members in different positions.
Figure 10:
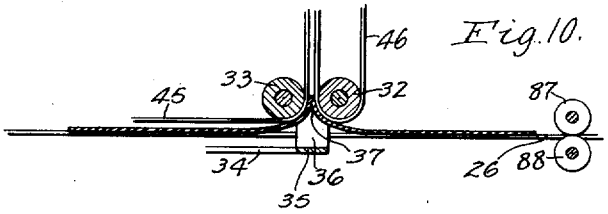
Figure 11:
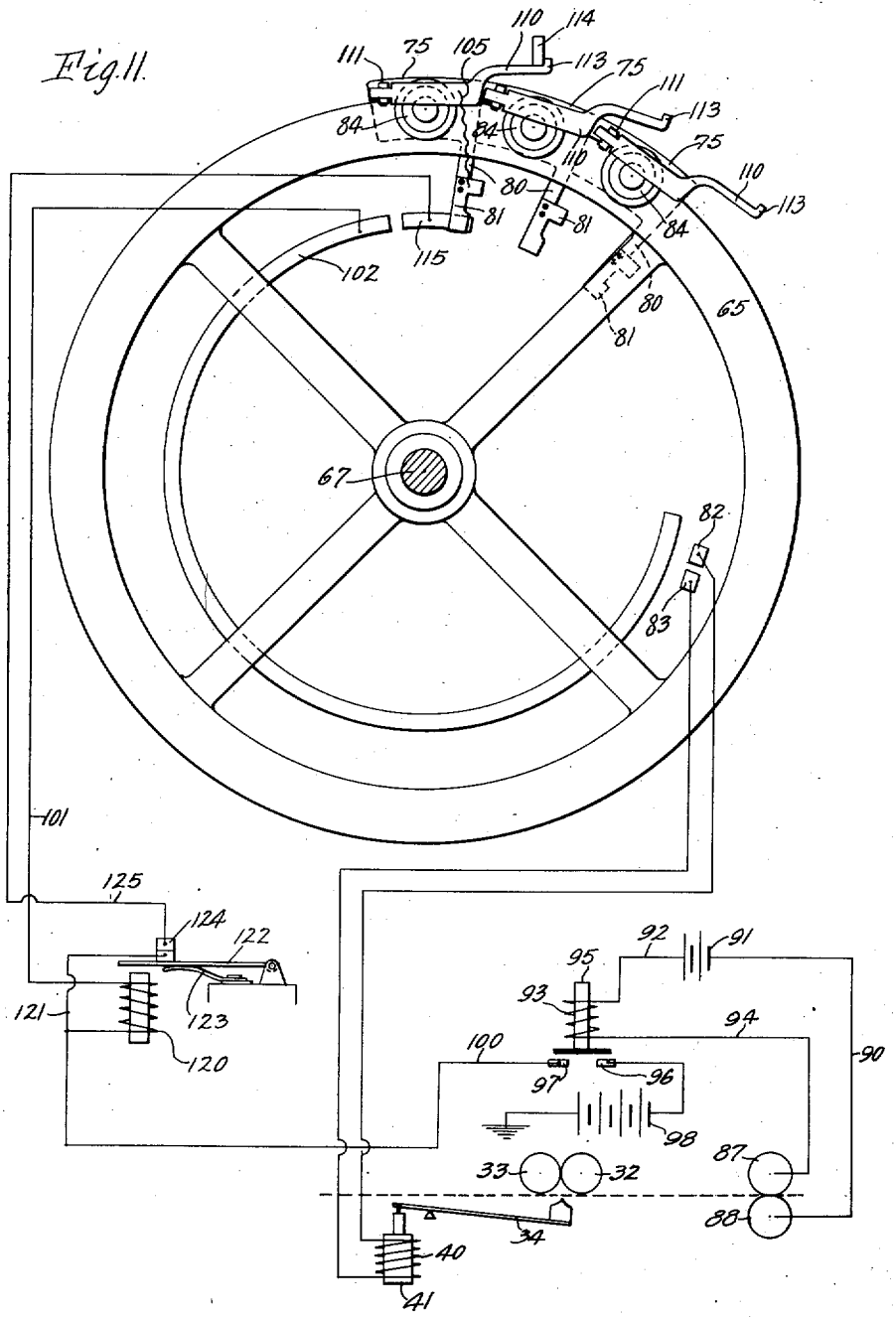
Fig. 11 is a diagrammatic view showing the electrical connection for one of the timing mechanisms of the folding machine.

While the sheet is passing along the upper runs of the tapes 26 it is engaged by folding means of any suitable construction, which, in the embodiment of the invention shown, comprise a feeding member which engages the sheet on the line along which it is to be folded, which may, for example, be midway between the ends of the sheet, and moves it between two sets of coöperating folding tapes or belts. In the construction shown for this purpose, two coöperating folding rolls 32, 33 are arranged above the tapes 26 in such a manner that a sheet on the tapes 26 may be moved upwardly and between the two rolls by means of a feeder or feeding member 34 arranged below the upper run of the tapes 26. The feeding member shown consists of a bar or rod 35 having a plurality of projections or teeth 36 adapted to enter between the tapes 26, the upper end of each tooth being provided with a point or folding edge 37, see Figs. 9 and 10, which moves the sheet to be folded between the folding rolls 32 and 33. The feeder may be moved toward and from the folding rolls by any suitable means, for example, the bar 35 may be mounted on an arm 38 pivoted at 39 and adapted to be swung about its pivot by means of a solenoid 40 having a core 41 attached to the arm 38. When the solenoid is energized the arm 38 will be swung about its pivot to bring the feeding member into the position shown in Fig. 10, in which the sheet will enter between the folding rolls 32 and 33.

Tapes 45 and a belt 46 are preferably provided which pass over the folding rolls 32 and 33 and between which the sheets are folded. The tapes 45 pass over a driving roll 47 and over the folding roll 33 and an idler roll 48, and the belt 46 passes over a driving roll 50, an idler roll 51, the folding roll 32, a folding roll 52, and is in engagement with the tapes 45 as they pass over the roll 48. The upper runs of the tapes 45 constitute a support for the once folded sheet from which the sheet can be engaged by a feeding device 53 similar in construction to the feeder 34 for folding the sheet for the second time. The feeding device 53 passes between the belt 46 and another set of tapes 55 passing over the folding roll 52 and a coöperating roll 54 respectively. The tapes 55 also pass over a driving roll 56 and an idler roll 57. If desired, another set of folding devices similar to those shown in connection with the tapes 26 and 45 may be used for folding the sheet for the third time as it passes over the upper run of the tapes 55.

The folded sheet passes over the upper run of the tapes 55 and is discharged to an inclined plate or table 58 from which it is removed from the machine. In case it is desired not to fold a sheet, it will pass over the upper run of the tapes 26 and to an inclined plate or table 59. Any other desired arrangement of the tapes and the folding rolls may be provided in which the sheet to be folded is carried from one set of folding rolls to another and removed from the machine.

Any suitable means, such as a sprocket wheel 60 and a sprocket chain 61, may be employed for transmitting movement to the tapes 26, the chain 61 being preferably driven from the ironing machine or other device from which the sheets are delivered to the folding machine, so that the tapes are driven continuously at the same speed at which the sheets are discharged from the ironing machine. The other tapes or belts may be driven in any suitable manner. For example, the roll 50 may be driven by means of a sprocket chain 62 from the shaft on which the roll 28 is mounted, and a chain 63 is shown connecting the shafts on which the rolls 50 and 56 are mounted. The roll 47 may be driven from the roll 56 by means of a crossed belt 64.

In the operation of the machine the sheet passes over the upper runs of the tapes 26 until the line along which the sheet is to be folded, which may be midway between the ends thereof, is directly over the points of the fingers of the feeding member. The feeding member is then actuated and the fingers enter into the spaces between the tapes 26 and move the center or other portion of the sheet to be folded into engagement with the tapes 45 and the belt 46. The sheet is then folded in two parts and is drawn upwardly away from the tapes 26 and passes along the upper runs of the tapes 45. When the middle or other portion to be folded of the folded sheet is over the points of the fingers of the feeding member 53, this member moves the central or other portion of the folded sheet upwardly between the tapes 55 and belt 46 and the sheet is then again folded in the same manner as heretofore described, and when the sheet arrives on the upper runs of the tapes 55 it is folded in two places, so that, if the feeding members are actuated so as to fold the sheets substantially midway between their ends, the sheets will be folded into four parts. As many additional feeding members and folding tapes or rolls as may be desired can be added if the sheet is to be folded more than twice.

By means of the construction described the sheets are supported by the tapes so that the machine is capable of operating on textile material of any kind, no matter how loosely woven or flexible the same may be.

The sheet is supported by the tapes in such a manner that the folding operation causes no wrinkling of the sheets.

The folding mechanism described may be actuated by any suitable means for the purpose of effecting the folding of the sheet at the desired point or line of fold, such, for example, as the center of the sheet. In the construction shown, this is accomplished by automatic means actuated by the sheets themselves as they pass into the folding machine. Briefly stated, these automatic timing or line of fold determining means may include a member which moves at the same speed as, or at a speed which bears a definite ratio to, the speed at which the sheet to be folded passes through the machine; and a second or proportional member which operates at half the speed of the first mentioned member if it is desired to fold the sheet in half, or at any other ratio to the speed of the first member, depending upon the ratio of the distance from the end of the sheet to the line on which the sheet is to be folded to the length of the sheet. The timing means also include a member or device which actuates the folding mechanism, for example, by actuating the feeding member, and which is connected with the proportional member when the front end of the sheet reaches a certain point on the folding machine, and which remains in engagement with the proportional member until the rear end of the sheet passes this point on the folding machine, at which time the folder or feeder actuating member is attached to the first or full speed member and moves therewith to contact points which are arranged at a distance from the starting point corresponding to the distance from the point at which the sheet enters the machine to the point above the fingers of the feeding member. When the contact points are connected by the feeder actuating member, a circuit is completed through the solenoid or magnet at the folding member for actuating the same. A timing mechanism is provided, in the construction shown, for each folding member and since all of the timing mechanisms are substantially alike, only the mechanism which is shown for controlling the folding member 34 will be described in detail.

In the construction of the timing or line of fold determining mechanism shown in Figs. 1 to 13, the full speed and proportional members or carriers above referred to, to which the feeder actuating member is adapted to be connected, are in the form of wheels 65 and 66 respectively, and are rotatably mounted on a fixed shaft 67 secured on brackets 68 mounted on the frame of the machine. The two wheels are preferably driven by suitable sprockets 69 and 70 secured thereon and connected by means of chains to sprocket wheels 71 and 72 respectively, which are mounted on a countershaft 73 journaled at the front end of the machine. The sprocket wheels 69 and 70 are preferably removably secured on the wheels 65 and 66 so that the speeds of these wheels may be varied as desired. The countershaft 73 is driven from the roll 28 by means of a sprocket chain 74. The several sprocket wheels are so proportioned that the proportional wheel 66 is driven at half the speed of the full speed wheel 65 if it is desired to fold the sheets in half.

75 represents a feeder actuating device or member which, in the particular embodiment of the invention shown, is frictionally mounted on the full speed wheel 65 in any suitable manner and by means of which the folding mechanism is caused to act on the sheet to be folded. In the construction shown, the feeder actuating member has a part straddling the peripheral portion of the wheel and a friction shoe 76 which is yieldingly pressed against one face of the wheel 65 by means of the spring 77 arranged in a spring housing 78 secured on the feeder actuating member 75. The friction shoe causes the feeder actuating member to move with the high speed wheel unless engaged by a stop which holds the feeder actuating member in the starting position, or unless the feeder actuating member is operatively connected with the proportional wheel, in which cases the friction shoe will slide on the face of the wheel 65. 79 represents a key or guide secured on the feeder actuating member and engaging in an annular groove in the full speed wheel 65 to hold the feeder actuating member on the wheel.

The feeder actuating member is provided with an arm 80 having a contact piece 81 mounted thereon and insulated therefrom. This contact piece is adapted to connect two contacts 82 and 83 suitably mounted on the frame of the machine and thereby complete a circuit through the solenoid or magnet 40 which causes the actuation of the feeder 34.

Any suitable means may be employed for causing the feeder actuating member to move with the proportional wheel 66 while a sheet is passing a given point at the receiving end of the machine. In the construction shown this is accomplished by means of an electromagnet 84 forming a part of the feeder actuating device and which is energized by means of a coil 85. The poles of the magnet are arranged in close proximity to the proportional wheel 66 so that when the coil is energized the feeder actuating device adheres to the wheel 66 and travels with the same, causing the friction shoe 76 to slide on the face of the wheel 65.

The coil 85 is energized when the front end of a sheet to be folded reaches a certain point at the receiving end of the machine, and is deënergized when the end of the sheet has passed beyond this point. This may be accomplished by means of a starting or contact device which, in the construction shown, includes a circuit which is completed when two contact wheels or disks 87 and 88, arranged at a point near the the receiving end of the machine, are separated or moved out of contact by means of a sheet passing into the machine, and which is interrupted when these two members are in contact. The contact disks 87 and 88 are mounted on suitable shafts journaled in the frame of the machine adjacent to the receiving end thereof and are so arranged that the sheet to be folded passes between the contact disks. Suitable driving gears 89 may be provided for rotating the disks so that their peripheral speed will be the same as the speed of the sheet to be folded. The free passage of the sheet along the upper runs of the tapes 26 is therefore not interfered with by the contact disks.

Any suitable means may be employed for energizing the magnet coils 85 when the contact disks 87 and 88 of the starting device are moved out of engagement. An example showing how this may be accomplished is disclosed diagrammatically in Fig. 11, in which one of the two contact disks or wheels 87 and 88 is connected by means of a conductor 90 to one terminal of a battery or other source of power 91. The other terminal is connected by means of a conductor 92 to a magnet coil or solenoid 93 from which a conductor 94 connects with the other contact disk. The coil 93 is provided with a core 95 which connects two contacts 96 and 97 when no current passes through the coil 93 owing to the separation of the disks 87 and 88 by a sheet to be folded, and which, when the circuit through the battery 91 and coil 93 is completed by the engagement of the contact disks 87 and 88, is held out of engagement with the contacts 96 and 97. The contact 96 is connected to one terminal of a battery 98, the other terminal of which is grounded. The contact 97 is connected by means of conductors 100 and 101 to a contact segment 102 from which the current is adapted to pass through the insulated contact piece 81 secured on the end of the arm 80 of the feeder actuating member 75. From the contact piece 81 current passes through a conductor 105 to one terminal of the magnet coil 85, the other terminal of the coil being grounded. By means of the connections described the magnet coil 85 of the feeder actuating member 75 will be energized when the contact disks 87 and 88 are moved out of engagement by a sheet passing into the machine. The feeder actuating member is therefore held in engagement and moves with the proportional member 66 as long as the contact disks 87 and 88 are out of engagement. As soon as these disks again contact, owing to the passing of the sheet beyond the contact disks, the current passing through the magnet coil 85 will be interrupted so that the feeder actuating member will again travel with the full speed wheel 65.

Means are also provided for causing the feeder actuating member to leave the initial or starting position at the instant that the sheet separates the contact disks 87 and 88. These means are preferably constructed as follows:

The feeder actuating member 75 is provided with a holding arm 110 which is pivoted thereon at 111 and which is normally swung outwardly from the feeder actuating member by means of a spring 112. The pivoted holding arm is provided at its end with a projection or hook 113 which, when the arm is swung outwardly, is adapted to engage with a stop 114 suitably arranged on the frame of the machine to hold the feeder actuating member 75 in its starting position, the friction shoe 76 sliding on the face of the wheel 65 while the feeder actuating member is so held. The pivoted arm 110 has a part extending adjacent to the magnet coil 85 so that when this coil is energized, owing to the passing of a sheet to be folded between the contact disks 87 and 88, the pivoted arm is drawn toward the magnet coil, causing the hook 113 to be moved out of engagement with the stop 114, thus permitting the feeder actuating member to move with the proportional wheel.

Since the distance between the contact disks 87 and 88 and the point at which the sheet is folded is great enough to accommodate several short sheets at one time, it is desirable to provide more than one feeder actuating member. In the construction shown, three of these members are provided. When the first member moves out of the position in which it is held by the stop 114, the second member moves forward to take its place. Means are provided for preventing more than one of the feeder actuating members to be moved from the initial position by a single sheet passing between the contact disks 87 and 88. For this purpose a second segment 115 is provided, which is insulated from the segment 102, and the two segments are so connected with the source of current that the supply of current to the segment 115 is interrupted as soon as the feeder actuating memebr 75 receives its current from the segment 102. The contact segments 102 and 115 may be mounted on the machine in any suitable manner, for example, on a bracket 116 secured on the frame of the machine, insulation 117, Fig. 6, being arranged between the bracket and the segments. For this purpose the conductors 100 and 101 are connected to the opposite terminals of the coil of an electromagnet 120. A branch conductor 121 of the conductor 100 connects with a movable contact member or arm 122 arranged in proximity to the magnet 120 and normally held out of engagement with the magnet by means of a spring 123 or other means. This spring moves the pivoted arm 122 into engagement with a fixed contact 124 so that current from the conductor 100 passes through the branch conductor 121, the movable contact arm 122, the fixed contact 124, and a conductor 125 leading to the segment 115 of the contact ring when no current is drawn from the contact segment 102. By means of this construction the current passes from the contact segment 115 to the magnet coil 85 of the feeder actuating member, causing the releasing of the holding arm 110 from the stop 114 and causing the feeder actuating member to adhere to the proportional wheel 66. As soon as this device is moved far enough to cause the contact piece 81 thereof to engage the segment 102, the current passes from the conductor 100 through the coil of the magnet 120 and through conductor 101, contact piece 81 and conductor 105 to the magnet coil 85. This energizes the electromagnet 120 and causes the pivoted contact arm 122 to be drawn toward the magnet, thus breaking the contact with the fixed contact 124. Consequently as long as the circuit to the magnet coil 85 is completed through the segment 102, no current will pass to the segment 115, so that the second feeder actuating device when moving into the initial position in which it engages the segment 115, can receive no current as long as the flow of current to the first feeder actuating device from the segment 102 is not interrupted, and the supply of current to the segment 102 is not interrupted until the sheet which caused the actuation of the first feeder actuating device passes out from between the contact disks 87 and 88.

When a number of short sheets are fed in quick succession to the folding machine, the contact segments 102 and 115 may be connected with the battery or source of current 98 several times during the time that the first feeder actuating member engages with this segment. Means of any suitable construction are provided to prevent any feeder actuating member from receiving energizing current from the segments 102 and 115 more than once during the engagement of the feeder actuating member therewith. In the embodiment of the invention shown in the drawings, the following construction is employed for this purpose.

The conductor 105 leading from the contact piece 81 of the feeder actuating member is divided into two parts, one part terminating in a fixed contact or switch member 130 being secured on and insulated from the feeder actuating member 75, and the other part of the conductor 105 being connected with a coöperating movable switch member or contact 131 mounted on the pivoted holding arm 110 and insulated therefrom. These members are so arranged that when the energizing current in the magnet coil 85 is interrupted, releasing the holding arm 110, the spring 112 pushes the holding arm outwardly to such an extent as to separate the two switch members.

Figure 7:
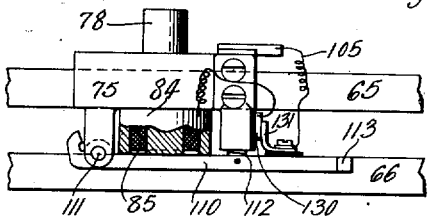
Figs. 7 and 8 are views showing one of the feeder actuating devices, the parts of the device being shown in different positions in the two views.
Figure 8:
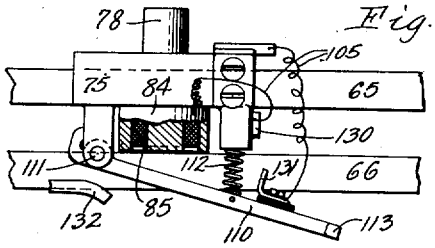

As the feeder actuating members are moved into the starting position, the arm 110 is pushed into a position to cause the switch members 130 and 131 to be moved into engagement, the switch members being preferably somewhat elongated so that they can be placed into electrical connection before the pivoted arm 110 is in its innermost position, shown in Fig. 7, in which position the feeder actuating device is released from the stop 114. The means employed in the construction shown for moving the switch members into engagement at the starting point of the feeder actuating devices, consists of a cam or guide 132 arranged in such a manner that the pivoted holding arm 110 of each feeder actuating device will be engaged by the cam 132 as the member moves into the starting position and will be moved inwardly to place the switch members 130 and 131 into engagement. The holding arm will then be in a position in which the hooked portion thereof engages with the stop 114 and in which the circuit from the contact piece 81 of the magnet coil 85 is complete, and the energizing of the magnet by the flow of current through the coil 85 will cause the holding arm to be released from the stop 114 and will cause the feeder actuating member to move with the proportional wheel 66. Consequently, if the segments 102 and 115 are connected with the energizing circuit more than once during the time the contact piece 81 of any feeder actuating member is in contact therewith, the magnet coil 85 of only the feeder actuating member which is in the initial or starting position will be energized, since the circuit from the contact member 81 to the magnet of all the other feeder actuating members will be broken by the separation of the switch members 130 and 131. Any other means may be employed for this purpose if desired.

In the operation of the folding machine, the sheet in passing between the contact disks 87 and 88, causes a feeder actuating member which is in the starting position to be magnetically held by the proportional wheel and to travel therewith until the end of the sheet has passed beyond the contact disks, so that the same are in engagement.

The engaging of the two contact disks causes the feeder actuating member to be released from the proportional wheel and to be frictionally held on the full speed wheel and to travel with the full speed wheel until it reaches the contacts 82 and 83. The closing of these contacts energizes the magnet coil 40 and causes the feeding member 34 to press the center of the sheet between the coöperating folding tapes 45 and belt 46. The distance from the feeding member 34 to the contact disks 87 and 88 is in the same proportion to the circumferential distance from the starting point of the feeder actuating devices 75 to the contacts 82 and 83 as the ratio of speeds of travel of the sheet and the periphery of the full speed disk respectively. While the feeder actuating device travels with the proportional wheel, it travels at a speed which bears the same ratio to the speed of the sheet passing into the machine as the ratio of the distance from the end of the sheet to the point at which the sheet is to be folded bears to the length of the sheet. Consequently, when the end of the sheet has passed the contact disks, assuming that the proportional wheel travels at half the speed of the full speed wheel, the feeder actuating device will have traveled a distance proportional to half the length of the sheet, and while traveling with the full speed wheel it maintains this relative position. Consequently the feeding member 34 will be actuated when the center of any sheet, regardless of its length, is over the points of the fingers of the feeding member. The contact segment 102 terminates approximately at the contact members 82 and 83 so that the feeder actuating member cannot again become connected with the energizing current until it is in its starting position.

Figure 12:
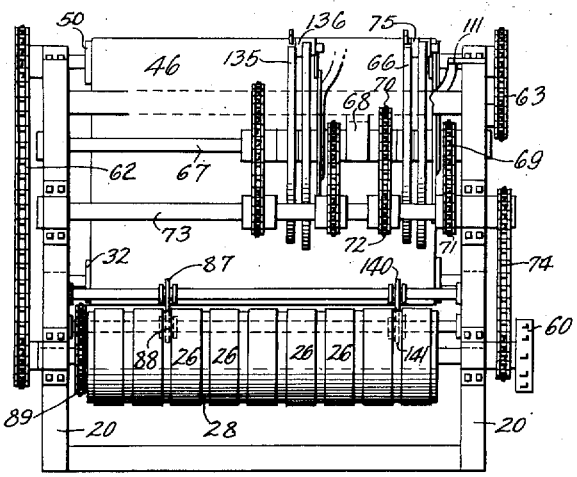
Fig. 12 is an end view of the folding machine embodying the invention.
Figure 13:
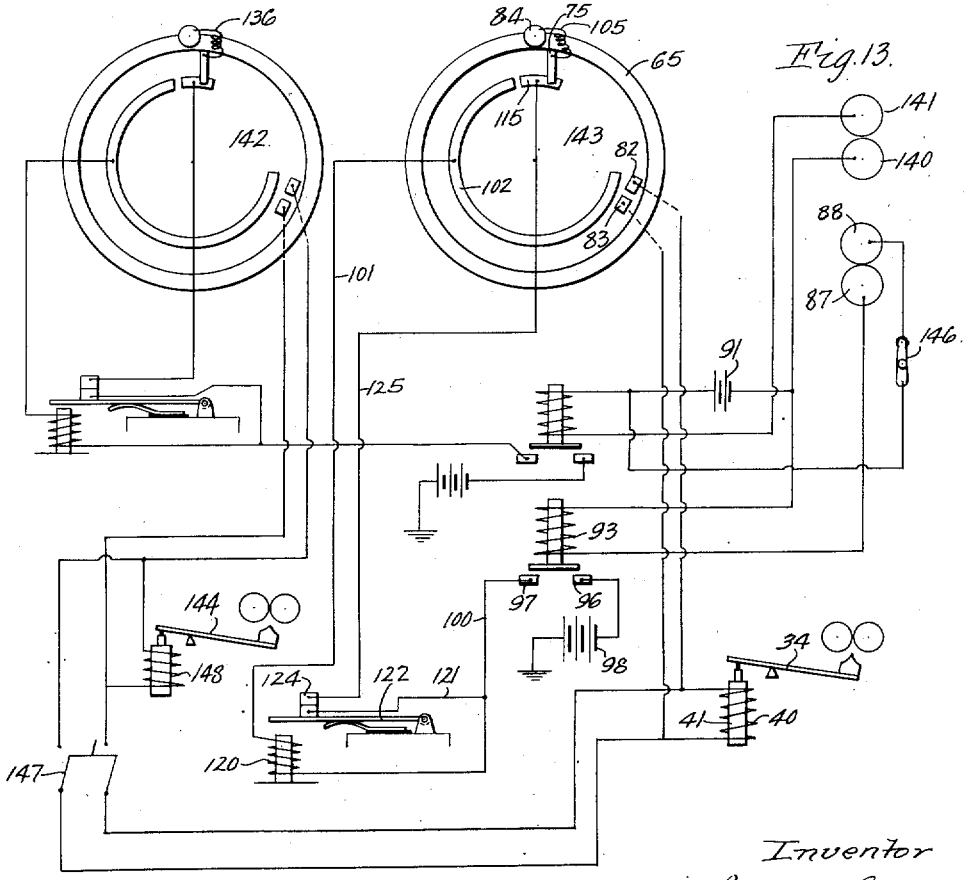
Fig. 13 is a diagrammatic view showing the electrical connections between two sections of the folding machine and the timing devices therefor.

The actuation of the second feeding member 53 is accomplished by a timing device substantially like the timing device described except that the wheel 135 thereof, see Fig. 12, which corresponds to the proportional wheel 66 of the timing mechanism described, will be driven at one quarter of the speed of the wheel 65 if it is desired to fold the sheet in equal parts, or at any other proportional speed, depending upon how the sheet is to be folded. The feeder actuating members 136 of the second timing device will be energized by the breaking or making of the contact between the disks 87 and 88, as described in the timing mechanism for the feeding member 34. The contacts of the second timing mechanism by means of which the second feeding member 53 is actuated and which corresponds to the contact members 82 and 83 of the first mentioned mechanism, will be spaced at a distance from the starting point of the feeder actuating devices proportional to the distance traveled by the sheet to be folded in passing from the contact disks 87 and 88 to a point above the feeding member 53. In case a third feeding mechanism or device is used, the timing mechanism therefor would be the same as the two described except that the slow speed or proportional wheel would travel at another proportional speed, for example, at one-eighth the speed of the full speed wheel, and that the two contacts corresponding to the contacts 82 and 83 would be spaced at a greater distance from the starting point of the feeder actuating devices 75, corresponding to the distance between the contact disks 87 and 88 and the fingers of the third feeding member. In the same manner any number of additional folding members and timing devices may be provided.

It will be understood from the description of the machine that while the speed or rate of movement of the movable members of the timing mechanism construction bear a definite fixed ratio to the rate of movement of the conveyers of the folding machine, yet the movable members may be started on their path of movement at any time during the movement of the article-carrying conveyer. This enables the machine to operate on articles regardless of whether the articles are spaced close together or are fed after considerable intervals of time, and makes it possible to feed articles to the machine at any time without waiting until the timing mechanism or conveyer reaches any particular position or point in its path of movement. Consequently, by providing the timing mechanism with a plurality of movable members, several articles may be passing through the machine at one time.

In order to enable a folding machine of this kind to fold all the sheets as they are fed from the ironing machine, it is desirable to divide the feeding members into two or more sections which are capable of being actuated together in case a wide sheet extending substantially throughout the width of the machine is to be folded, and which act separately when a number of narrow sheets are passed through the machine side by side. In the construction shown, the feeding member 34 is divided into two similar sections, see Figs. 2 and 12, and a second set of contact disks 140 and 141 corresponding to the disks 87 and 88 is provided, each set being adapted to actuate its own section of the feeding member independently of the other section. In order to cause the two sections of the feeding member to be actuated simultaneously, in case a wide sheet passes through the machine, the electrical connections shown diagrammatically in Fig. 13 may be employed although other means may be used for this purpose, if desired. The two sets of contact disks 140, 141 and 87 and 88 are adapted to actuate two timing devices, which, for sake of convenience, are designated in Fig. 13 as 142 and 143 respectively. These timing devices control the operation of the two sections or feeding members 144 and 34 respectively. In case the wide sheet passes through the machine, it is desirable to control the actuation of the two sections or feeding members by means of one of the sets of contact disks and one timing device. For this purpose a switch 146 is provided in the circuit of one of the sets of contact disks, for example, the set 87, 88, and when opened this switch renders the timing device 143 inoperative. A switch 147 is provided which connects the electromagnets 148 and 40 of the feeding members 144 and 34 respectively, in such a manner that both of these magnets will be energized when the contacts of the timing device 142 are connected by a feeder actuating member of this device. The two switches 146 and 147 are preferably connected together by any suitable means not shown, so that they can be actuated simultaneously.

Timing means of alternative construction for actuating the feeding members of the folding machine are shown in Figs. 14–19 inclusive. In the construction shown in these figures, the timing mechanism is mounted on a frame or support 160 which may, if desired, be detached or separate from the frame of the folding machine. The movable parts of the timing device are actuated from a countershaft 161 mounted on the frame 160 and driven from the shaft carrying the roll 28 of the folding machine by a belt 162 or other suitable means.

In the timing devices shown in Figs. 14–19, the full speed member is in the form of a shaft 165 which is driven by a sprocket chain 166 or other means from the countershaft 161. The proportional members of the timing devices are represented by wheels or disks 167 and 168 rotatably mounted on the shaft 165 and driven from the countershaft 161 by means of chains 169 and 170. 172 represents feeder actuating members, each of which comprises an arm 174 having an enlarged or disk portion 175 which is rotatably mounted on the shaft 165. The feeder actuating members are preferably made of fiber or other insulating material. The disk portion 175 of each of the feeder actuating means is arranged between friction disks 176 splined on the shaft 165 and pressed by means of a spring 177 against a collar 178 secured on the shaft. By means of this construction the feeder actuating members move with the shaft 165 unless held in their initial position by means of a stop 180 corresponding to the stop 114, shown in the construction first described, or unless held in engagement with the proportional member. The stop 180 in the construction shown is pivoted at 181 on the frame of the machine and is yieldingly held by means of a spring 182 against a fixed pin or part 183. The spring 182 is of such strength as to hold the feeder actuating members against the friction of the disks, but when the feeder actuating members are connected with the proportional member the stop 180 is swung about its pivot against the action of the spring and permits the feeder actuating member to move with the proportional member.

In this alternative construction the connection of the feeder actuating member with the proportional member is also accomplished by means of an electromagnet, and the electrical connections between the parts are substantially the same as described in the other construction. 185 represents an electromagnet mounted on the arm 174 of the feeder actuating member and arranged in close proximity to the proportional member. Current is transmitted to the electromagnet by means of a contact 186 mounted on the arm 174 and contacting with segments 187 and 188 which are mounted on a plate or table 190 secured on the frame 160. The contact member 186 is connected by means of a conductor 191 with a switch member 192 mounted on an arm 193 pivoted at 194 on the magnet 185, see Figs. 16, 17 and 18. The switch member 192 is adapted to connect with switch members 195 to close a circuit through the electromagnet 185 when the arm 193 is in its lower position, in which position the arm 193 is held by the magnetism of the electromagnet 185 when the same is excited. When the flow of current to the electromagnet is interrupted, the arm 193 is moved by means of a spring 196 into a position in which the switch members 192 and 195 are out of contact. When a feeder actuating member approaches the starting position the arm 193 thereof engages a cam 198 which moves the arm 193 downwardly against the action of the spring 196 to connect the switch members 192 and 195.

The actuation of the feeding member of the folding mechanism is accomplished in the same manner as in the first construction described. For this purpose a circuit closing spring or contact 200 is mounted on the arm 174 and connects two contacts 201 and 202, which completes a circuit through the electromagnet actuating the feeding member.

The operation of the timing mechanism shown in Figs. 14–19 inclusive is as follows:

The rotation of the shaft 165 moves the first of a series of feeder actuating members into the starting position in engagement with the stop 180. The member remains in this position until the magnet 185 is actuated by the passing of a sheet between the contact disks 87 and 88, which causes the feeder actuating member to move with the proportional member until the end of the sheet has passed the contact disks 87 and 88. The feeder actuating member then moves with the shaft 165 and the friction disks 176 mounted thereon until the contact member 200 engages the contacts 201 and 202, which causes the actuation of the feeding member. The feeder actuating member then moves on until it abuts against one of the other feeder actuating members or until it reaches the starting position.

Timing devices other than the two devices described may be employed for causing the actuation of the folding mechanism at such time as to fold the sheet at the line along which the fold as desired, and it is also not intended to limit the invention to the particular form of folding mechanism shown, since folding mechanisms of other construction could be employed in connection with the timing mechanism embodying the invention.

I claim as my invention:

1. The combination of a mechanism for folding sheets of different lengths, and mechanism controlled by the length of the sheets for timing the actuation of the folding mechanism to cause the folding mechanism to fold sheets of different lengths at different distances from the ends of the sheets proportional to the lengths of the sheets.

2. In a sheet folding machine, the combination of folding means, means for placing a sheet into operative relation to said folding means, and means for actuating said folding means when the part of the sheet to be folded is in operative relation to the folding member, the operation of said actuating means being controlled by the length of the sheet to be folded.

3. In a sheet folding machine, the combination of a folding device, means for causing the travel of sheets of different lengths relative to the folding device, actuating means for the folding device automatically controlled by the lengths of the sheets without manual adjustment for timing the operation of the folding device to cause sheets of different lengths to be folded at distances from the ends of the sheets, which distances are corresponding fractional portions of the lengths of the several sheets.

4. In a sheet folding machine, the combination of folding devices, means for supplying sheets in proximity to said folding devices, means for moving the sheets from said supplying means into operative relation to said folding devices, and electromagnetic means controlled by the sheets to be folded and having a movable member connected with said moving means for actuating said moving means to feed a sheet to said folding devices.

5. In a sheet folding machine, the combination of folding devices, feeding means in operative relation to said folding devices for feeding sheets to said folding means, and electromagnetic means controlled by the sheets to be folded and having a movable part connected with said feeding means for actuating the same to feed sheets to said folding devices.

6. In a sheet folding machine, the combination of a traveling carrier for the sheet to be folded, folding means arranged adjacent to the path of movement of the carrier, and means for actuating said folding means when the part of the sheet to be folded is in operative relation to the folding means, the operation of said actuating means being controlled by the length of the sheet to be folded.

7. In a sheet folding machine, the combination of a movable carrier on which the sheet to be folded is supported, folding devices arranged in operative relation to the carrier, a member for moving a portion of the sheet from said carrier into engagement with said folding devices, and means for actuating said member when the part of the sheet to be folded is in operative relation to the folding member, the operation of said actuating means being controlled by the length of the sheet to be folded.

8. The combination of a mechanism for folding sheets of different lengths, and timing mechanism controlled by the lengths of the sheets to be folded for causing the actuation of said folding mechanism to fold sheets of different lengths at distances from the ends thereof corresponding to the lengths of the sheets.

9. The combination of a mechanism for folding sheets of different lengths, mechanism controlled by the length of the sheets for timing the actuation of the folding mechanism to cause the folding mechanism to fold sheets of different lengths at different distances from the ends of the sheets proportional to the lengths of the sheets, and means engaged by a sheet while passing to said folding mechanism to cause the actution of said timing mechanism.

10. In a sheet folding machine, the combination of folding means for a sheet, and timing mechanism controlled by the length of the sheets passing into the machine and causing the folding means to be actuated to fold each sheet at a distance from one end thereof, said distance being a predetermined fraction of the length of the sheet.

11. In a sheet folding machine, the combination of a movable carrier on which the sheet to be folded is supported, folding means arranged in proximity to the path of movement of the carrier, and timing mechanism controlled by the length of the sheets to be folded for actuating said folding means to cause each sheet to be folded at a distance from one end thereof proportional to the length of the sheet.

12. In a sheet folding machine, the combination of a folding device, means for causing the travel of sheets of different lengths relative to the folding device, actuating means for the folding device, mechanism operating automatically without manual adjustment for timing the operation of the folding device to cause sheets of different lengths to be folded at distances from the ends of the sheets, which distances are corresponding fractional portions of the lengths of the several sheets.

13. In a sheet folding machine, the combination of folding means for sheets, timing mechanism adapted to actuate said folding means and comprising a movable actuating member, means operated by the sheets passing through the machine and controlled by the lengths of the sheets for controlling the movement of said movable member, and means controlled by said movable member for actuating said folding means to cause each sheet to be folded at a distance from one end thereof which bears a definite fixed relation to the length of the sheet.

14. In a sheet folding machine, the combination of folding means for a sheet, timing mechanism adapted to actuate said folding means and comprising a member movable at a speed bearing a definite proportion to the rate of movement of a sheet toward the folding means while said sheet is passing a particular point, means for causing said member to move at a different speed proportional to the speed of the sheet after said sheet has passed said point, said member causing the actuation of said folding means when reaching a definite point of its movement, whereby sheets of different lengths will be folded at points located at definite distances from their ends relative to the lengths of the sheets.

15. The combination of a sheet folding mechanism, means engaged by the sheet while passing a fixed point in its movement to said folding mechanism, and timing mechanism controlled by said means for causing the actuation of said folding mechanism to fold sheets of different lengths at predetermined distances from the ends thereof, said distances having a definite fixed ratio to the lengths of the sheets.

16. The combination of a sheet folding mechanism, electrical contacts past which the sheet moves and which are engaged by the sheet while passing by said contacts on its way to said folding mechanism, and timing mechanism controlled by said contacts for actuating said folding means to cause sheets of different lengths to be folded at a distance from one end thereof bearing a predetermined ratio to the length of the sheet.

17. The combination of a sheet folding mechanism, electrical contact members which are normally in contact and which are separated by a sheet passing to said folding mechanism, and a timing mechanism placed into operation by the separation of said contact members and actuating said folding mechanism to cause sheets of different lengths to be folded each at a distance from one end thereof bearing a definite fixed ratio to the length of the sheet.

18. The combination of a sheet folding device, means for bringing a sheet into operative relation to said folding device, controlling means past which the sheet moves and which are actuated by the opposite ends of a sheet in passing to said folding device, and an actuating member operatively connected with said controlling means and having means causing the sheet to be fed from said carrier to said folding device when a part of the sheet to be folded is in operative relation to the folding device.

19. The combination of a sheet folding device, means by which the sheets are brought into operative relation to said folding device, and a timing mechanism which has a part engaged by a sheet passing to said folding device and which is actuated in accordance with the length of the sheet for controlling the operation of said timing mechanism.

20. The combination of a sheet folding device, means by which the sheets are brought into operative relation to said folding device, and a timing mechanism comprising a part past which the sheet moves and which is engaged by a sheet while passing to said folding device, and a movable folder actuating member, the movement of which is controlled by said part engaged by the sheet and which is operatively connected with and controls the operation of said folding device for folding sheets of different lengths in predetermined proportions to their lengths without manual adjustment of the folding device.

21. The combination of a sheet folding device, means by which the sheets are brought into operative relation to said folding device, and a timing mechanism comprising a part engaged by a sheet passing to said folding device, a plurality of movable members, a folder actuating member movable with said members, means controlled by said part engaged by the sheet for operatively connecting said folder actuating member with one or another of said movable members, and means actuated by said folder actuating member for causing the actuation of said folding device.

22. In a sheet folding machine, the combination of a carrier for the sheets to be folded, a folding device arranged in operative relation to said carrier and including folding members and a feeding member which moves the portion of the sheet to be folded from said carrier to said folding members, a timing mechanism operatively connected with said feeding member for actuating the same, and means controlled by the lengths of the sheets passing to said folding device for controlling the action of said timing mechanism.

23. In a sheet folding machine, the combination of a carrier for the sheets to be folded, a folding device arranged in operative relation to said carrier and including folding members and a feeding member which moves the portion of the sheet to be folded from said carrier to said folding members, a timing mechanism, means controlled by the lengths of the sheets passing to said folding device for controlling the operation of said timing mechanism, and electromagnetic means connecting said timing mechanism and said feeder member for actuating said member.

24. In a sheet folding machine, the combination of a folding device including folding members and a feeding member which moves the portion of the sheet to be folded to said folding members, timing mechanism including a part which is movable to cause the actuation of said sheet feeding member, and electrical contact devices actuated by the passing of a sheet to said folding device and connected with said timing device for controlling the operation thereof to cause sheets to be folded in proportion to their lengths without requiring manual adjustment of the machine.

25. In a sheet folding machine, the combination of a carrier for the sheets to be folded, a folding device arranged in operative relation to said carrier and including folding members and a feeding member which moves the portion of the sheet to be folded from said carrier to said folding members, timing mechanism having a movable member, electrical contact devices actuated by the passing of a sheet to said folding device and connected with said timing device for controlling the operation thereof, an electromagnet for actuating said feeder member, and connections between said movable member of the timing mechanism and said magnet for actuating said feeder member.

26. The combination of a sheet folding device, means by which the sheets to be folded are brought into operative relation to said folding device, timing mechanism, means controlled by the lengths of the sheets passing to said folding device for controlling the operation of said timing mechanism, and connections between said timing mechanism and said folding device for actuating said folding device.

27. The combination of a sheet folding device, means by which the sheets to be folded are brought into operative relation to said folding device, timing mechanism, means controlled by the lengths of the sheets passing to said folding device for controlling the operation of said timing mechanism, and electrical means controlling the operation of said folding device and actuated by said timing mechanism.

28. The combination of a sheet folding device, means by which the sheets to be folded are brought into operative relation to said folding device, timing mechanism including a movable member, electrical contacts actuated by the opposite ends of a sheet passing to said folding device and electrically connected with said timing mechanism for controlling the operation of the same, and electrical means connecting said movable member of the timing mechanism and said folding device for actuating said folding device.

29. The combination of a sheet folding device, means by which the sheets to be folded are brought into operative relation to said folding device, timing mechanism including a movable folder actuating member, means actuated by the opposite ends of a sheet passing to said folding device for controlling the movement of said folder actuating member, and means adapted to be actuated by said folder actuating member and connected with said folding device for operating the same.

30. The combination of a sheet folding device, means by which the sheets to be folded are brought into operative relation to said folding device, timing mechanism including a movable folder actuating member, a plurality of movable members with which said folder actuating member is adapted to move, means engaged by a sheet passing to said folding device for causing said folder actuating member to move with one or another of said movable members, and means adapted to be engaged by said folder actuating member during its movement to actuate said folding device.

31. The combination of a sheet folding device, means by which the sheets to be folded are brought into operative relation to said folding device, timing mechanism including a movable folder actuating member, a plurality of movable members with which said folder actuating member is adapted to move, electrical contacts engaged by a sheet passing to said folding device, electrical connections between said contacts and said folder actuating member for operatively connecting said member with one or another of said movable members, and means adapted to be engaged by said folder actuating member during its movement to actuate said folding device.

32. The combination of a sheet folding device, means by which the sheets to be folded are brought into operative relation to said folding device, timing mechanism including a movable folder actuating member, a plurality of movable members with which said folder actuating member is adapted to move, electrical contacts engaged by a sheet passing to said folding device, electrical connections between said contacts and said folder actuating member for operatively connecting said member with one or another of said movable members, an electromagnet for actuating said folding device, and electrical connections between said folder actuating member and said electromagnet for causing the actuation of said magnet.

33. The combination of a sheet folding device, means by which the sheets to be folded are brought into operative relation to said folding device, timing mechanism including a movable folder actuating member, a plurality of movable members with which said folder actuating member is adapted to move, electrical contacts engaged by a sheet passing to said folding device, electromagnetic means for connecting said folder actuating member with one of said movable members, connections between said contacts and said electromagnetic means, means for causing said folder actuating member to move with another movable member when said electromagnetic means is de-energized, and means controlled by said folder actuating member for actuating said folding device.

34. The combination of a sheet folding device, means by which the sheets to be folded are brought into operative relation to said folding device, timing mechanism including a movable folder actuating member, two members movable at different speeds, means actuated by a sheet in passing to said folding device to cause said folder actuating member to move with one of said movable members, frictional means for causing said folder actuating members to move with said other movable member when disconnected from said first mentioned movable member, and means controlled by said folder actuating member for actuating said folding device.

35. The combination of a sheet folding device, means by which the sheets to be folded are brought into operative relation to said folding device, timing mechanism including a movable folder actuating member, a plurality of movable members with which said folder actuating member is adapted to move, electrical contacts engaged by a sheet passing to said folding device, electromagnetic means for connecting said folder actuating member with one of said movable members, connections between said contacts and said electromagnetic means, frictional means for causing said folder actuating member to move with another of said movable members when released from said first mentioned movable member, and means controlled by said folder actuating member for actuating said folding device.

36. The combination of a sheet folding device, means by which the sheets to be folded are brought into operative relation to said folding device, timing mechanism including a movable member, means engaged by a sheet passing to said folding device for controlling the operation of said timing mechanism, an electromagnet for actuating said folding device, connections between said timing mechanism and said electromagnet, and means actuated by the movable member of said timing device for closing a circuit through said electromagnet.

37. The combination of a sheet folding device, means by which the sheets to be folded are brought into operative relation to said folding device, timing mechanism including a folder actuating member, a plurality of movable members with which said folder actuating member is adapted to move, electrical contacts engaged by a sheet passing to said folding device, electromagnetic means for connecting said folder actuating member with one of said movable members, connections between said contacts and said electromagnetic means, frictional means for causing said folder actuating member to move with another of said movable members when released from said first mentioned movable member, an electromagnet for actuating said folding device, connections between said timing mechanism and said electromagnet, and a circuit adapted to be closed by said timing mechanism to actuate said electromagnet.

38. A timing device for sheet folding mechanisms comprising a member which travels at a definite speed proportional to the speed of travel of a sheet to the folding mechanism, a second member which moves at a predetermined proportionately slower speed than said first mentioned member, a folder actuating member, a device past which said sheet travels, means controlled by said device for causing the folder actuating member to travel with said slow speed member while the sheet travels past said device and then causing said folder actuating member to travel with said other member to a predetermined point for actuating said folding mechanism.

39. A timing device for sheet folding mechanisms comprising a member which travels at a definite speed proportional to the speed of travel of a sheet to the folding mechanism, a second member which moves at a predetermined proportionately slower speed than said first mentioned member, a folder actuating member, a device past which the sheet travels and which is operatively connected with said folder actuating member to cause the same to travel with said slow speed member while the sheet travels past said device, and means for causing said folder actuating device to travel with said other member to a predetermined point for actuating the folder mechanism.

40. A timing device for sheet folding mechanisms comprising a member which travels at a definite speed proportional to the speed of travel of a sheet to the folding mechanism, a second member which moves at a predetermined proportionately slow speed than said first mentioned member, a folder actuating member, a device past which the sheet travels and which is operatively connected with said folder actuating member to cause the same to travel with said slow speed member while the sheet travels past said device, means for causing said folder actuating device to travel with said other member to a predetermined point, and means at said point connected with said folding mechanism and actuated by said folder actuating member to cause the folding mechanism to operate.

41. A timing device for sheet folding mechanisms comprising a folder actuating device which is adapted to move at a definite speed proportional to the speed of travel of a sheet to the folding mechanism, a member which moves at a predetermined proportionately slower speed than the normal speed of said folder actuating member, a device past which said sheet travels, means controlled by said device for causing the folder actuating member to travel with said slow speed member while a sheet is moving past said device, and means arranged at a predetermined point along the path of movement of said folder actuating member, said means being engaged by said folder actuating member to actuate said folding mechanism.

42. A timing device for sheet folding mechanisms comprising a folder actuating device which is adapted to move at a definite speed proportional to the speed of travel of a sheet to the folding mechanism, a member which moves at a predetermined proportionately slower speed than the normal speed of said folder actuating member, a stop for holding said folder actuating member in a starting position, a device past which the sheet travels toward said folding mechanism, means controlled by said device for causing said folder actuating member to move from said starting position and to move with said slow speed member while the sheet travels past said device and then causing said folder actuating device to travel at said speed proportional to the speed of travel of the sheet, to a predetermined point for actuating said folding mechanism.

43. In a sheet folding machine, the combination of a folding mechanism and a timing mechanism comprising two members one of which moves at a predetermined proportionately slower speed than the other member, a folder actuating member adapted to be connected with either of said members for moving therewith, means engaged by a sheet passing to said folding mechanism and connecting said folder actuating member with said slow speed member while said means are engaged by a sheet, means for causing said folder actuating member to travel with said other member when disconnected from said slow speed member, and means controlled by said folder actuating member to actuate said folding mechanism.

44. In a sheet folding machine, the combination of a folding mechanism and a timing mechanism comprising a folder actuating member which normally remains stationary and which when released travels at a predetermined speed, a member which moves at a predetermined proportionately slower speed than said folder actuating member, means engaged by a sheet passing to said folding mechanism for connecting said folder actuating member with said slow speed member while said means are engaged by said sheet and for releasing said folder actuating member when the sheet has passed said means, and means controlled by said folder actuating member to actuate said folding mechanism.

45. In a sheet folding machine, the combination of a folding mechanism and a timing mechanism comprising a folder actuating member which is adapted to travel at a predetermined speed, a member which moves at a predetermined proportionately slower speed than said folder actuating member, a stop for releasably holding said folder actuating member in a starting position, means engaging a sheet passing to said folding mechanism, said means connecting said folder actuating member with said slow speed member and causing said folder actuating member to move from its starting position, said folder actuating member being released from said slow speed member when the sheet has passed said sheet-engaging means, and means controlled by said folder actuating member to actuate said folding mechanism.

46. In a sheet folding machine, the combination of a folding mechanism, and a timing mechanism comprising a folder actuating member movable at different speeds, a stop for holding said folder actuating member in a starting position, means actuated by a sheet passing said folding mechanism for controlling the movement of said folder actuating member and for causing the same to leave said starting position, and means for causing said folder actuating member to actuate said folding mechanism.

47. In a sheet folding machine, the combination of a folding mechanism, and a timing mechanism comprising a folder actuating member which normally remains stationary and which when released moves at a predetermined speed, a member which moves at a predetermined proportional slower speed than said folder actuating member, an electromagnet mounted on said folder actuating member and arranged in proximity to said slower speed member, means engaged by a sheet passing to said folding mechanism for energizing said magnet to cause said folder actuating member to move with said slow speed member, and means controlled by said folder actuating member to actuate said folding mechanism.

48. In a sheet folding machine, the combination of a folding mechanism, and a timing mechanism comprising a folder actuating member which normally remains stationary in a starting position and which when released moves at a predetermined speed, a member which moves at a predetermined proportional slower speed than said folder actuating member, an electromagnet mounted on said folder actuating member and arranged in proximity to said slower speed member, a stop for holding said folder actuating member in a starting position, means engaged by a sheet passing to said folding mechanism for energizing said magnet and for causing said folder actuating member to move from said starting position with said slow speed member, and means controlled by said folder actuating member to actuate said folding mechanism.

49. In a sheet folding machine, the combination of a folding mechanism and a timing mechanism comprising a plurality of folder actuating members which normally remain stationary in a starting position and which when released travel around an endless path at a predetermined speed, a member which moves at a predetermined proportionately slower speed than said folder actuating members, a stop for holding said folder actuating members at a starting position, means controlled by a sheet passing to the folding mechanism for releasing said folder actuating members from said stop and causing the same to travel with said slow speed member while said sheet is in operative relation to said means, and means controlled by said folder actuating members, to actuate said folding mechanism.

50. In a sheet folding machine, the combination of a folding mechanism and a timing mechanism comprising a folder actuating member movable at different speeds, a stop for releasably holding said member at a starting position, means actuated by a sheet passing to said folding mechanism for releasing said member from said stop, and means controlled by said folder actuating member for actuating said folding mechanism.

51. In a sheet folding machine, the combination of a folding mechanism and a timing mechanism comprising a folder actuating member movable in an endless path, a stop in the path of movement of said member for releasably holding said member at a starting position, means engaged by a sheet passing to said folding mechanism for releasing said member from said stop, and means having a part arranged in said path of movement and adapted to be engaged by said folder actuating member for actuating said folding mechanism.

52. In a sheet folding machine, the combination of a folding mechanism and a timing mechanism comprising a plurality of folder actuating members movable in an endless path, means actuated by a sheet passing to said folding mechanism for controlling the movements of said members, means arranged in the path of movement of said members and controlled by said members for actuating said folding mechanism, and a stop arranged in the path of movement of said members for releasably holding said members at a starting position.

53. In a sheet folding machine, the combination of a folding mechanism and a timing mechanism comprising a folder actuating member movable at different speeds, a stop for releasably holding said member in a starting position, electrically-operated means for causing the initial movement of said member, means engaged by a sheet passing to said folding mechanism for supplying current to said electrically-operated means, and means for causing said folder actuating member to actuate said folding mechanism.

54. In a sheet folding machine, the combination of a folding mechanism and a timing mechanism comprising a plurality of folder actuating members movable in an endless path, a stop for releasably holding said members in a starting position, electrically-operated means mounted on said members for causing the initial movement thereof, means for supplying electric current to said members including a starting contact member engaged by said folder actuating members when in the starting position, a second contact member engaged by said folder actuating members after leaving said starting position, means for interrupting the supply of current to said starting contact member when one of said folder actuating members receives current from said second contact member, and means for causing said folder actuating member to actuate said folding mechanism.

55. In a sheet folding machine, the combination of a folding mechanism and a timing mechanism comprising a plurality of folder actuating members movable in an endless path, a stop for releasably holding said members in a starting position, electrically-operated means mounted on said members for causing the initial movement thereof, means for supplying electric current to said members including a starting contact member engaged by said folder actuating members when in the starting position, a second contact member engaged by said folder actuating members after leaving said starting position, a switch through which current passes to said starting contact member, and electromagnetic means actuated by current passing to said second contact member for opening said switch when current passes to said second contact member, and means for causing said folder actuating members to actuate said folding mechanism.

56. A timing mechanism for sheet folding machines, comprising a folder actuating member movable at different speeds, means for controlling the movement of said folder actuating member, including electrical means for causing movement of said member, a switch through which current passes to said electrical means, and means for causing the opening of said switch when the supply of current to said electrical means is interrupted.

57. A timing mechanism for sheet folding machines, comprising a folder actuating member movable at different speeds, means for controlling the movement of said folder actuating member including electrical means for causing movement of said member, a switch through which current passes to said electrical means, means for closing said switch when said member is in a starting position, and means for opening said switch when the supply of current to said electrical means is interrupted.

58. A timing mechanism for sheet folding machines comprising a folder actuating member movable at different speeds, means for controlling the movement of said folder actuating member including electrical means for causing movement of said member, a current controlling device through which current passes to said electrical means, means for closing said current controlling device when said member is in a starting position to permit current to pass to said electrical means, means for holding said current controlling device in closed position, and means for opening said current controlling device when the supply of current to said electrical means is interrupted.

59. A timing mechanism for sheet folding machines comprising a folder actuating member movable at different speeds, means for controlling the movement of said folder actuating member including electrical means for causing movement of said member and mounted on said member, a switch mounted on and movable with said folder actuating member and through which current passes to said electrical means, means for closing said switch when said member is in a starting position, and means for opening said switch when the supply of current to said electrical means is interrupted.

60. A timing mechanism for sheet folding machines comprising a folder actuating member movable at different speeds in an endless path, means for controlling the movement of said folder actuating member including electrical means mounted on said member and movable therewith, a switch through which current passes to said electrical means, a cam for closing said switch when said member moves to a starting position, said electrical means holding said switch closed when current passes to said electrical means, and means for opening said switch when the flow of current is interrupted.

61. In a sheet folding machine, the combination of a folding mechanism, and a timing mechanism comprising a folder actuating member which normally remains stationary in a starting position and which when released moves at a predetermined speed, a member which moves at a predetermined proportional slower speed than said folder actuating member, an electromagnet mounted on said folder actuating member and arranged in proximity to said slower speed member, means for controlling the supply of current to said electromagnet for causing said folder actuating member to move with said slow speed member including a switch through which current passes to said electromagnet, and means for opening said switch when the flow of current to said electromagnet is interrupted.

62. In a sheet folding machine, the combination of a folding mechanism, and a timing mechanism comprising a folder actuating member which normally remains stationary in a starting position and which when released moves at a predetermined speed, a member which moves at a predetermined proportional slower speed than said folder actuating member, an electromagnet mounted on said folder actuating member and arranged in proximity to said slower speed member, means for controlling the supply of current to said electromagnet for causing said folder actuating member to move with said slow speed member including a switch through which current passes to said electromagnet, said switch being held in closed position by said electromagnet when the same is energized, and means for opening said switch when the supply of current to said electromagnet is interrupted.

63. In a sheet folding machine, the combination of means for folding a sheet while moving through said machine, a timing mechanism for causing the actuation of said folding means, said timing mechanism comprising a folder actuating member adapted to move at a definite speed proportional to the speed of movement of the sheet, a proportional member which moves at a speed bearing a fixed ratio to the speed of said actuating member, said ratio being the same as the distance from the rear end of a sheet to the transverse line on which the sheet is to be folded is to the length of the sheet, means for causing said actuating member to travel with said proportional member while the sheet is passing a given point on the machine, and means controlled by said folder actuating member for actuating said folding means when said folder actuating member reaches a definite point in its travel.

64. In a sheet folding machine, the combination of a folding mechanism, and a timing mechanism comprising a folder actuating member which normally remains in a stationary position and which when released moves at a predetermined speed, a member which moves at a predetermined proportional slower speed than said folder actuating member, a device actuated by a sheet passing to said folding mechanism, means controlled by said device when engaged by the front end of the sheet for causing said actuating member to move with said slow speed member, and means controlled by said device for releasing said folder actuating member from said slow speed member when the rear end of the sheet has passed beyond said device, and means controlled by said folder actuating member to actuate said folding mechanism.

65. In a sheet folding machine, the combination of a folding mechanism and a timing mechanism comprising two members one of which moves at a predetermined proportionately slower speed than the other member, a folder actuating member adapted to be connected with either of said members for moving therewith, a device actuated by a sheet passing to said folding mechanism, and means controlled by said device when said device is engaged by the front end of a sheet for causing said actuating member to move with said slow speed member, and means controlled by said device when the rear end of said sheet passes beyond said device for causing said folder actuating member to move with said high speed member, and means controlled by said folder actuating member for actuating said folding mechanism.

66. In a sheet folding machine, the combination of a carrier for the sheets to be folded, a plurality of folding mechanisms arranged in operative relation to said carrier and extending transversely of the direction of movement of the sheets, and a timing mechanism for each of said folding mechanisms, each timing mechanism being controlled by the sheets to be folded by its folding mechanism, and means adapted to be operated at will for causing said folding mechanisms to act in unison.

67. In a sheet folding machine, the combination of a carrier for the sheets to be folded, a plurality of folding mechanisms arranged in alinement transversely of the direction of movement of said sheets and in operative relation to said carrier, a timing mechanism for each of said folding mechanisms, each timing mechanism being controlled by the sheets to be folded by its folding mechanism, and means for actuating all of said folding mechanisms from one of said timing mechanisms.

68. In a sheet folding machine, the combination of a carrier for the sheets to be folded, a plurality of folding mechanisms arranged in operative relation to said carrier, a feeding member for each folding mechanism adapted to feed a sheet from the carrier to a folding mechanism, a timing mechanism for each feeding member, each timing mechanism being controlled by the sheets to be engaged by its feeding member for actuating said feeding member to cause the folding of the sheets, and means adapted to be operated at will to cause said folding mechanisms to act in unison.

69. In a sheet folding machine, the combination of a carrier for the sheets to be folded, a plurality of folding mechanisms arranged in operative relation to said carrier, a feeding member for each folding mechanism adapted to feed a sheet from the carrier to a folding mechanism, a timing mechanism for each feeding member, each timing mechanism being controlled by the sheets to be engaged by its feeding member for actuating said feeding member to cause the folding of the sheets, each of said timing mechanisms and its feeding member acting independently of each other to fold a plurality of relatively narrow sheets arranged side by side on said carrier, and means operable at will for connecting all of said feeding members with one of said timing members for folding a single wide sheet.

70. In a sheet folding machine, the combination of a folding device, means for causing the travel of sheets of different lengths relative to the folding device, actuating means for the folding device including controlling means which contact with the leading and rear ends of the sheets and operate automatically without manual adjustment for timing the operation of the folding device to cause sheets of different lengths to be folded at distances from the ends of the sheets, which distances are corresponding fractional portions of the lengths of the several sheets.

71. A timing device for sheet folding mechanisms comprising a member which travels at a definite speed proportional to the speed of travel of a sheet to the folding mechanism, a second member which moves at a predetermined proportionately slower speed than said first mentioned member, a folder actuating member, means for causing the folder actuating member to travel with said slow speed member while the sheet travels past a point on its travel to the folding mechanism and then causing said folder actuating member to travel with said other member to a predetermined point for actuating said folding mechanism.

72. The combination of folding means, means for causing sheets to move to the folding means, contact means past which the sheets move and which are actuated by the leading and rear ends of the sheets, and electrical mechanism which is controlled by the actuation of said contact means by the leading and rear ends of the sheets for causing the actuation of the folding means dependent upon the lengths of the sheets.

73. The combination, in a folding machine, of a mechanism for starting a line of fold determining mechanism, a conveying mechanism for conveying an article to be folded to, past and away from said starting mechanism, a line of fold determining mechanism operatively connected with the starting mechanism, and a folding mechanism operatively connected with the line of fold determining mechanism, the starting mechanism being actuable by an article brought into contact with it by conveying mechanism in front of the starting mechanism.

74. The combination in a folding machine, of a folding mechanism, a line of fold determining mechanism for operating said folding mechanism, and a starting mechanism for said line of fold determining mechanism, said starting mechanism being operable by the article to be folded.

75. The combination in a folding machine, of a folding mechanism, a line of fold determining mechanism for operating said folding mechanism, a starting mechanism for said line of fold determining mechanism, said starting mechanism being operable by the article to be folded, and a continuously movable carrier for the articles to be folded, which carries the article to and away from said starting mechanism.

76. The combination in a folding machine, of a folding mechanism, mechanism for moving a sheet continuously through the machine, a line of fold determining mechanism for actuating said folding mechanism, and a starting device actuated by the sheet for starting the operation of said line of fold determining mechanism.

77. The combination of a mechanism for folding sheets of different lengths, and mechanism controlled by the length of the sheets for timing the actuation of the folding mechanism to cause the folding mechanism to fold sheets of different lengths at different distances from the ends of the sheets proportional to the lengths of the sheets, the operation of said timing mechanism being started by the leading end of a sheet passing to the folding mechanism.

78. In a sheet folding machine, the combination of folding means, means for moving a sheet into operative relation to said folding means, means for actuating said folding means when the part of the sheet to be folded is in operative relation to the folding member, and contact means governing the operation of the actuating means and controlled by the full length of the sheet moving to said folding means.

79. The combination in a folding machine, of a folding mechanism, a line of fold determining mechanism including a plurality of movable members, each of which is adapted to actuate said folding mechanism, and starting mechanism actuated by the articles passing to said folding mechanism for enabling each sheet to start the movement of one of said movable members, whereby a plurality of sheets may pass through the machine at a time in succession.

80. The combination in a folding machine, of a folding mechanism, a line of fold determining mechanism including a plurality of members for actuating said folding mechanism, said members being movable in an endless path, a stop for holding said members at a starting position, and a starting mechanism operated by articles passing to said folding mechanism for starting the movement of said actuating members, whereby a plurality of sheets may pass through the machine at a time.

81. The combination in a folding machine of a folding mechanism, a line of fold determining mechanism including a plurality of movable members each of which is adapted to actuate said folding mechanism, and means actuated by the articles passing to said folding mechanism for controlling the movement of said movable members, whereby a plurality of sheets may pass through the machine at a time.

82. The combination in a folding machine, of a folding mechanism, a mechanism for determining a line of fold at a predetermined point, said line of fold mechanism having more than one movable actuating member, each of which is adapted to actuate said folding mechanism, the movement of said actuating members being controlled by articles passing to said folding mechanism, each article controlling the movement of one of said actuating members.

83. In a folding machine, the combination of a folding mechanism, a plurality of movable members, each of which is adapted to determine the line of fold of an article, continuously moving means for moving articles through the machine, and mechanism connected with said movable members and actuated by the articles for controlling the operation of said movable members, each article controlling the operation of one of said movable members.

84. The combination in a folding machine, of a folding mechanism, a line of fold determining mechanism for operating said folding mechanism, a contact member for controlling the operation of said line of fold determining mechanism, and continuously movable means for moving said articles into engagement with said contact member.

85. The combination in a folding machine, of a folding mechanism, a line of fold determining mechanism for operating said folding mechanism, and an electrical device engaged by the articles to be folded for governing the operation of said line of fold determining mechanism.

86. The combination in a folding machine, of a folding mechanism, a line of fold determining mechanism including a movable member for actuating said folding mechanism, a stop for holding said movable member in a starting position, and mechanism actuated by the articles passing to said folding mechanism for starting the movement of said actuating member from its starting position.

87. The combination in a folding machine, of a folding mechanism, a line of fold determining mechanism including a plurality of movable members, each of which is adapted to actuate said folding mechanism, starting mechanism actuated by the articles passing to said folding mechanism for enabling each sheet to start the movement of one of said movable members, and means for preventing an article from interfering with the operation of any of said movable members excepting the movable member started by said article.

88. The combination in a folding machine, of a folding mechanism, a line of fold determining mechanism including a plurality of movable members, each of which is adapted to actuate said folding mechanism, a contact device engaged by the articles passing through the machine and connected with said line of fold determining mechanism to start the movement of one of said movable members and control the movement thereof as long as an article is in engagement with said contact device, and means for controlling the movement of said movable members after the articles have passed said contact device, whereby articles may pass through the machine at any distance from each other.

89. The combination in a folding machine, of a folding mechanism, a line of fold determining mechanism including a plurality of movable members, each of which is adapted to actuate said folding mechanism and to travel in an endless path, a contact device engaged by the articles passing through the machine and operatively connected with said line of fold determining mechanism to start the movement of one of said movable members when said contact device is engaged by the leading end of an article and to control the movement of said movable member while said article is in engagement with said contact device, and means independent of said contact device for completing the movement of a movable member around said endless path after the article has passed out of engagement with said contact device.

90. The combination in a folding machine, of a folding mechanism, a line of fold determining mechanism including a plurality of movable members, each of which is adapted to actuate said folding mechanism and to travel in an endless path, means controlled by an article for starting the movement of one of said movable members when the leading end of the article reaches a given point on the machine and for controlling the movement of said movable member while said article is passing said point, and means for continuing the travel of said movable member in its path after said article passes said point, whereby said movable member is not interfered with by other articles passing through the machine ahead of and in rear of said article.

91. The combination in a folding machine, of a folding mechanism, a line of fold determining mechanism for operating said folding mechanism, a continuously movable carrier which receives the articles to be folded and conveys them with an uninterrupted movement to said folding mechanism, and means controlled by the leading and rear ends of the articles passing to said folding mechanism to control the operation of said line of fold determining mechanism.

92. The combination in a folding machine, of a folding mechanism, a line of fold determining mechanism for operating said folding mechanism, and means permanently arranged in the path of movement of the articles passing to said folding mechanism and engaged by said articles to control the operation of said line of fold determining mechanism.

93. The combination in a folding machine, of a folding mechanism, a line of fold determining mechanism for operating said folding mechanism, a continuously movable carrier which receives the articles to be folded and conveys them to said folding mechanism, and a device permanently arranged in the path of movement of the articles passing to said folding mechanism and engaged by the articles to control the operation of said line of fold determining mechanism.

94. In a folding machine, the combination of means for conveying the articles to be folded through the machine, a folding mechanism for folding the articles transversely of the direction of movement of the articles through said machine, said mechanism being formed in sections arranged in alinement transversely of the direction of movement of said articles, a line of fold determining mechanism for each section, and means for connecting more than one of said sections with one of said line of fold determining mechanisms, whereby the sections so connected may be operated in unison by one of said line of fold determining mechanisms.

95. In a folding machine, the combination of means for conveying the articles to be folded through the machine, a folding mechanism for folding the articles transversely of the direction of movement of the articles through said machine, said mechanism being formed in sections arranged in alinement transversely of the direction of movement of said articles, a line of fold determining mechanism for each section, each line of fold determining mechanism being normally connected to one of said sections for operating said section independently of the other sections, and means for connecting said sections so that the sections so connected can be operated from one of said line of fold determining mechanisms.

96. In a folding machine, the combination of means for conveying the articles to be folded through the machine, a folding mechanism for folding the articles transversely of the direction of movement of the articles through said machine, said mechanism being formed in sections arranged in alinement transversely of the direction of movement of said articles, a line of fold determining mechanism for each section, each line of fold determining mechanism being normally connected to one of said sections for operating said section independently of the other sections, and a switch for forming an electrical connection between adjacent sections, whereby the sections so connected can be operated from a single line of fold determining mechanism.

97. In a folding machine, the combination of means for conveying the articles to be folded through the machine, a folding mechanism for folding the articles transversely of the direction of movement of the articles through said machine, said mechanism being formed in sections arranged in alinement transversely of the direction of movement of said articles, a line of fold determining mechanism for each section, each line of fold determining mechanism being electrically connected with its respective section, and an electrical switch adapted when closed to connect adjacent sections, whereby adjacent sections may be operated in unison from a single line of fold determining mechanism.

98. In a folding machine, the combination of means for conveying the articles to be folded through the machine, a folding mechanism for folding the articles transversely of the direction of movement of the articles through said machine, said mechanism being formed in sections arranged in alinement transversely of the direction of movement of said articles, a line of fold determining mechanism for each section, each line of fold determining mechanism being normally connected to one of said sections for operating said section independently of the other sections, means for connecting said sections so that the sections so connected can be operated from one of said line of fold determining mechanisms, and means for rendering other line of fold determining mechanisms inoperative.

99. In a folding machine, the combination of means for conveying the articles to be folded through the machine, a folding mechanism for folding the articles transversely of the direction of movement of the articles through said machine, said mechanism being formed in sections arranged in alinement transversely of the direction of movement of said articles, a line of fold determining mechanism for each section, and a contact device for each section and connected with the line of fold determining mechanism of the corresponding section, means for connecting more than one of said sections with one of said line of fold determining mechanisms, and means for breaking the connections between the other line of fold determining mechanisms and the corresponding contact devices, for rendering said other line of fold determining mechanisms inoperative.

100. In a folding machine, the combination of means for conveying the articles to be folded through the machine, a folding mechanism for folding the articles transversely of the direction of movement of the articles through said machine, said mechanism being formed in sections arranged in alinement transversely of the direction of movement of said articles, a line of fold determining mechanism for each section, each line of fold determining mechanism being electrically connected with its respective section, a contact device for each section and electrically connected with the line of fold determining mechanism of the corresponding section, an electrical switch adapted when closed to connect adjacent sections for enabling one line of fold determining mechanism to actuate more than one section, and means for breaking the electrical connections between the other line of fold determining mechanism and the corresponding contact device for rendering the other line of fold determining mechanisms inoperative.

101. In a folding machine, the combination of a movable carrier for the articles to be folded, folding means arranged adjacent to the path of movement of the carrier, and means for actuating said folding means when a part of the article to be folded is in operative relation to said folding means, the operation of said actuating means being controlled by the leading and rear ends of the articles passing to said folding means.

102. In a folding machine, the combination of means for folding articles, and line of fold determining mechanism controlled by the leading and rear ends of the articles passing to said folding means and causing the folding means to be actuated to fold each article at a distance from one end thereof, which distance is a predetermined fraction of the length of the article.

103. The combination of a sheet folding device, means by which the sheets are brought into operative relation to said folding device, and a timing mechanism which has a part engaged by a sheet passing to said folding device and the operation of which is started when the leading end of the sheet engages said part and which is actuated in accordance with the length of the sheet for controlling the operation of said timing mechanism.

104. The combination of a sheet folding device, means by which the sheets are brought into operative relation to said folding device, and a timing mechanism which has a part engaged by a sheet passing to said folding device and the operation of which is started when the leading end of the sheet engages said part and the operation of which is modified when the rear end of said sheet passes out of engagement with said part so that the timing mechanism is actuated in accordance with the length of the sheet.

105. The combination of a sheet folding device, means by which the sheets are brought into operative relation to said folding device, and a timing mechanism which has a part engaged by a sheet passing to said folding device and the operation of which is started when the leading end of the sheet engages said part and the operation of which is modified when the rear end of said sheet passes out of engagement with said part so that the timing mechanism is actuated in accordance with the length of the sheet, said timing mechanism having means for continuing the operation thereof after said sheet passes out of engagement with said part.

106. The combination of a sheet folding device, means by which the sheets are brought into operative relation to said folding device, and a timing mechanism which has a part engaged by a sheet passing to said folding device and the operation of which is started when the leading end of the sheet engages said part and the operation of which is modified when the rear end of said sheet passes out of engagement with said part so that the timing mechanism is actuated in accordance with the length of the sheet, said timing mechanism having means adapted to be placed into operation by a succeeding sheet immediately after the rear end of the first sheet has passed beyond said part, to control the folding of said succeeding sheet, whereby a plurality of sheets may pass through the machine at one time.

107. In a sheet folding machine, the combination of means for supplying sheets to the folding machine, a carrier adapted to receive said sheets and to carry the same through the machine without interrupting the movement thereof, a folding mechanism, and a timing mechanism for controlling the operation of said folding mechanism to fold sheets of different lengths at different distances from the ends of the sheets proportional to the lengths of the sheets.

108. In a sheet folding machine, the combination of means for feeding sheets to the folding machine from a preceding machine, a carrier on said folding machine adapted to receive sheets and to carry the same through said folding machine without interrupting the movement thereof, a folding mechanism on said folding machine, and a timing mechanism controlled by the length of the sheets passing through said folding machine and causing the folding mechanism to be actuated to fold each sheet at a distance from one end thereof, said distance being a predetermined fraction of the length of the sheet.

109. The combination in a folding machine, of a folding mechanism, a conveyer for moving the articles to said folding mechanism, a line of fold determining mechanism including a plurality of movable members each of which is adapted to actuate said folding mechanism, said movable members being movable in proportion to the movement of said conveyer, and means actuated by the articles passing to said folding mechanism for controlling the movement of said movable members, independently of the position of said conveyer.

110. The combination in a folding machine, of a folding mechanism, means for conveying articles through said machine and including parts movable in endless paths, a line of fold determining mechanism including a plurality of movable members movable in an endless path independent of the paths of said conveying means and at a speed proportional to the speed of said conveying means, and means actuated by articles passing to said folding mechanism for starting the movement of said movable members at any portion of the movement of said conveying means.

111. The combination in a folding machine, of a folding mechanism, means for conveying articles through said machine and including parts movable in endless paths, a line of fold determining mechanism including a plurality of movable members movable in endless paths independent of the paths of said conveying means, and at a speed proportional to the speed of said conveying means, means on said line of fold determining mechanism for enabling a plurality of said movable members to move through their path of movement independently of each other, and means actuated by articles passing to said folding mechanism for controlling the movement of said movable members, each article controlling the movement of one of said movable members, whereby a plurality of sheets may be passing simultaneously through the machine.

ALLISON M. MacFARLAND.